(12) United States Patent
Polisetty et al.

(10) Patent No.: US 11,593,461 B2
(45) Date of Patent: Feb. 28, 2023

(54) SYSTEMS AND METHODS FOR THIRD-PARTY LIBRARY MANAGEMENT

(71) Applicant: ServiceNow, Inc., Santa Clara, CA (US)

(72) Inventors: Vinaykumar Polisetty, Santa Clara, CA (US); Gnanaganesh Dhanavel, Santa Clara, CA (US); Sravan Srungarapu, Fremont, CA (US); Rajesh Sao, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 1024 days.

(21) Appl. No.: 16/298,782

(22) Filed: Mar. 11, 2019

(65) Prior Publication Data

US 2020/0293631 A1  Sep. 17, 2020

(51) Int. Cl.
*G06F 21/10* (2013.01)
*G06N 20/00* (2019.01)
*G06F 8/71* (2018.01)
*G06F 8/36* (2018.01)

(52) U.S. Cl.
CPC .............. *G06F 21/105* (2013.01); *G06F 8/36* (2013.01); *G06F 8/71* (2013.01); *G06N 20/00* (2019.01)

(58) Field of Classification Search
None
See application file for complete search history.

(56) References Cited

U.S. PATENT DOCUMENTS

| | | |
|---|---|---|
| 6,321,229 B1 | 11/2001 | Goldman et al. |
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,895,586 B1 | 5/2005 | Brasher |

(Continued)

OTHER PUBLICATIONS

Ahmad, "Digital Library Service Quality Assessment Model", 2013, ScienceDirect (Year: 2013).*

(Continued)

*Primary Examiner* — Hossain M Morshed
(74) *Attorney, Agent, or Firm* — Fletcher Yoder PC

(57) ABSTRACT

In accordance with the present approach, a library management system identifies third-party libraries that developers request to incorporate into a software release. The library management system may determine whether a master ticket or usage ticket for a new third-party library exists. If a master or usage ticket is not already existing and approved for the third-party library, the third-party library management system may automatically analyze the third-party library to determine whether it corresponds to third-party libraries that are already approved and stored in a central repository. After approval of a master ticket, the third-party library may be incorporated into the central repository and referenced by subsequent usage tickets that are particular to an individual software release. If not approved, the library management system provides the third-party library to a manual approval system. Moreover, the library management system provides efficient reporting of and access to statuses of the requested third-party libraries.

17 Claims, 11 Drawing Sheets

(56) References Cited

U.S. PATENT DOCUMENTS

| | | | |
|---|---|---|---|
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warbenburg | |
| 7,131,037 B1 | 10/2006 | LeFaive | |
| 7,170,864 B2 | 1/2007 | Matharu | |
| 7,392,300 B2 | 6/2008 | Anantharangachar | |
| 7,610,512 B2 | 10/2009 | Gerber | |
| 7,617,073 B2 | 11/2009 | Trinon | |
| 7,685,167 B2 | 3/2010 | Mueller | |
| 7,689,628 B2 | 3/2010 | Garg | |
| 7,783,744 B2 | 8/2010 | Garg | |
| 7,890,802 B2 | 2/2011 | Gerber | |
| 7,900,199 B2 * | 3/2011 | Gassoway | G06F 9/4486 717/165 |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,457,928 B2 | 6/2013 | Dang | |
| 8,478,569 B2 | 7/2013 | Scarpelli | |
| 8,554,750 B2 | 10/2013 | Rangaranjan | |
| 8,646,093 B2 | 2/2014 | Myers et al. | |
| 8,674,992 B2 | 3/2014 | Poston | |
| 8,689,241 B2 | 4/2014 | Naik | |
| 8,743,121 B2 | 6/2014 | De Peuterv | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 8,887,133 B2 | 11/2014 | Behnia | |
| 8,983,982 B2 | 3/2015 | Rangarajan | |
| 9,015,188 B2 | 4/2015 | Behne | |
| 9,037,536 B2 | 5/2015 | Vos | |
| 9,065,783 B2 | 6/2015 | Ding | |
| 9,122,552 B2 | 9/2015 | Whitney | |
| 9,137,115 B2 | 9/2015 | Mayfield | |
| 9,239,857 B2 | 1/2016 | Trinon | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,659,051 B2 | 5/2017 | Hutchins | |
| 9,792,387 B2 | 10/2017 | George | |
| 9,852,165 B2 | 12/2017 | Morozov | |
| 10,002,203 B2 | 6/2018 | George | |
| 11,106,448 B2 * | 8/2021 | Shtein | G06F 8/41 |
| 2019/0294428 A1 * | 9/2019 | Scheiner | H04L 67/34 |
| 2020/0285488 A1 * | 9/2020 | Yao | G06F 8/36 |
| 2020/0293631 A1 * | 9/2020 | Polisetty | G06N 20/00 |

OTHER PUBLICATIONS

Bauer, "A Structured Approach to Assess Third-Party Library Usage", 2012, 28th IEEE International Conference on Software Maintenance (ICSM) (Year: 2012).*

Huber, "Reducing Business and Legal Risks in Software Reuse Libraries", 1994, IEEE (Year: 1994).*

Sestak, "Process for approval of third party libraries", 2016, Masaryk University (Year: 2016).*

Thung, "Automated Library Recommendation", 2013, IEEE (Year: 2013).*

* cited by examiner

JAR DEPENDENCY ⊗  ⊙

SCAN INSTANCE

JAR DEPENDENCY

* SELECT CATEGORY — 450
JAR DEPENDENCY ▶

SELECT BRANCH: — 452
JAKARTA ▶

* SELECT BUILD: — 454
JAKARTA JAN09 (11.0.0.6...)

[COMPARE RESULTS] 🔍 ⓘ

— 430

[COPY LINK]

EXTERNAL JARS IN JAKARTA JAN09 (11.0.0.685) WITHOUT APPROVED THIRD-PARTY TICKETS   [−]4

ANY UNAPPROVED THIRD-PARTY PACKAGE WILL IMPACT YOUR MERGE TO MASTER. PLEASE TAKE ACTION AS DESCRIBED BELOW.
REJECTED - THEY MUST BE REMOVED FROM THE PRODUCT PROMPTLY.
AUTO CREATED - THESE TICKETS WERE SYSTEM-CREATED ON BUILDTOOLS1, PLEASE CLICK THE LIBRARY NAME AND FILL OUT ADDITIONAL INFORMATION.
PENDING APPROVAL - PLEASE TRACK THEIR PROGRESS AS YOU WILL NOT BE ABLE TO MERGE INTO MASTER. THE COMMITTER INFORMATION IS RETRIEVED BY RUNNING "GIT LOG" ON THE REPO WHERE THIS JAR IS INTRODUCED.

— 460    — 462    — 464

| STATUS | JAR NAME | VERSION | GROUP ID | REPO NAME | PROJECT NAME | COMMITTER |
|---|---|---|---|---|---|---|
| REJECTED | VORBIS-JAVA-CORE | 0.1 | ORG.GAGRAVARR | GLIDE | GLIDE | USER1 |
| REJECTED | VORBIS-JAVA-TIKA | 0.1 | ORG.GAGRAVARR | GLIDE | GLIDE | USER1 |
| AUTO CREATED | TIKA-PARSERS | 1.4 | ORG.APACHE.TIKA | GLIDE | GLIDE | USER1 |
| PENDING APPROVAL | JFREECHART-JCOMMON | 1.0.0-RC1-SNC1 | COM.SNC | GLIDE | GLIDE | USER2 |

*FIG. 9*

TEST FAILURES FOR TRACK-ITFM JAN10 (14.ITFM.0.1.30) - 0/6592 TESTS, 0/62 PROJECTS (NT) NIGHTLY TEST RESULTS <BUILDTOOLS1@COMPANY.COM
RECIPIENT1, RECIPIENT2 ◄─────── 484
WEDNESDAY, JANUARY10, 2018 AT 3:03PM
SHOW DETAILS

REPORT PRHISH

TEST OBJECT: TRACK-IFTM JAN10 (14.ITFM.0.1030)

EXTERNAL JARS WITHOUT APPROVED THIRD-PARTY TICKETS

ANY UNAPPROVED THIRD-PARTY PACKAGE WILL IMPACT YOUR MERGE TO MASTER. PLEASE TAKE ACTION AS DESCRIBED BELOW.

REJECTED - THEY MUST BE REMOVED FROM THE PRODUCT PROMPTLY.
AUTO CREATED - THESE TICKETS WERE SYSTEM-CREATED ON BUILDTOOLS1, PLEASE CLICK THE LIBRARY NAME AND FILL OUT ADDITIONAL INFORMATION.
PENDING APPROVAL - PLEASE TRACK THEIR PROGRESS AS YOU WILL NOT BE ABLE TO MERGE INTO MASTER.
THE COMMITTER INFORMATION IS RETRIEVED BY RUNNING "GIT LOG" ON THE REPO WHERE THIS JAR IS INTRODUCED.

| STATUS | JAR NAME | VERSION | GROUP ID | REPO NAME | PROJECT NAME | COMMITTER |
|---|---|---|---|---|---|---|
| REJECTED | JAR1 | 0.9.3 | GROUP1 | GLIDE | GLIDE | USER1 |
| REJECTED | JAR2 | 0.7 | GROUP2 | GLIDE | GLIDE | USER1 |
| REJECTED | JAR3 | 1.5.3 | GROUP3 | GLIDE | GLIDE | USER1 |

TEST PROJECTS

| TOTAL | SUCCESSFUL | FAILED | PENDING OR NOT TRIGGERED |
|---|---|---|---|
| 62 | 62 | 0 | 458 |

TESTS

| TOTAL | PASSED | FAILED | IGNORED | UNSTABLE | WORK IN PROGRESS |
|---|---|---|---|---|---|
| 6592 | 6366 | 0 | 226 | 0 | 0 |

*FIG. 10*

SYSTEMS AND METHODS FOR THIRD-PARTY LIBRARY MANAGEMENT

BACKGROUND

The present disclosure relates generally to management of third-party software libraries.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Enterprises and other organizations may develop various applications (e.g., software) that may be licensed or sold to other entities and implemented on various types of computational systems. Such applications may be implemented using executable computer code (e.g., a script) that may be changed or further developed (e.g., updated, patched, modified) over time. In this manner, developers are able to modify a version of the application to meet additional needs or purposes identified by the organization or entity using the application. The modified computer code (e.g., a subsequent version of the application) may therefore include augmentations to the original computer code of the application.

In many cases, software developers modify the computer code of the application to include or reference third-party libraries that supplement the operation of the application. To be appropriately packaged with the application, the third-party libraries may require approval from engineering, legal, and/or security departments of the enterprise. However, manually analyzing and approving these third-party libraries may be a work-intensive operation that is performed after development of a next release of the software application, potentially slowing the next release. Accordingly, there is a need to improve the manner in which third-party libraries are detected, analyzed, and approved for incorporation within an application.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present approach relates generally to systems and methods for third-party library management. In particular, the disclosed third-party library management system automatically identifies and analyzes source code for third-party libraries that software developers request to implement within a software release of a particular software product. In contrast to current development processes that may only scan source code for third-party libraries once a software release is fully prepared, the third-party library management system continually monitors a code base of the software release to discover third-party libraries in real time. As such, the third-party library management system may improve the operation, legality, and security of the software release during development. Generally, the third-party library management system maintains a collection of master tickets indicative of whether a particular library is approved for universal use within an enterprise, as well as a collection of usage tickets indicative of whether a particular library is approved for use within a particular software release or product of the enterprise. A third-party library associated with an approved master ticket may therefore be stored within a central repository, which is referenced by individual approved usage tickets to authorize incorporation of the third-party library within respective product releases.

As such, as the third-party library management system receives a request to add a new third-party library to the central repository, the third-party library management system determines whether a master ticket or usage ticket for the new third-party library exists. If a master or usage ticket is not already existing and approved for the third-party library, the third-party library management system may automatically analyze the third-party library to determine whether it passes multiple security and operational screenings or filters. If the third-party library is not automatically approved by this process, the third-party library may be passed or transmitted to engineering, security, and/or legal teams to receive manual approval. After approval of a master ticket, the third-party library may be incorporated into the central repository and referenced by subsequent usage tickets that are particular to an individual software release. Accordingly, the third-party library management system enables the enterprise to efficiently secure and monitor its code base, providing a significant reduction in manual effort employed during current development processes that maintain third-party libraries manually.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 9 is a screenshot of an embodiment of a buildtools report generated by the third-party library management system, in accordance with aspects of the present disclosure;

FIG. 10 is a screenshot of an embodiment of a periodic tracking email generated by the third-party library management system, in accordance with aspects of the present disclosure.

DETAILED DESCRIPTION

Figure 1:
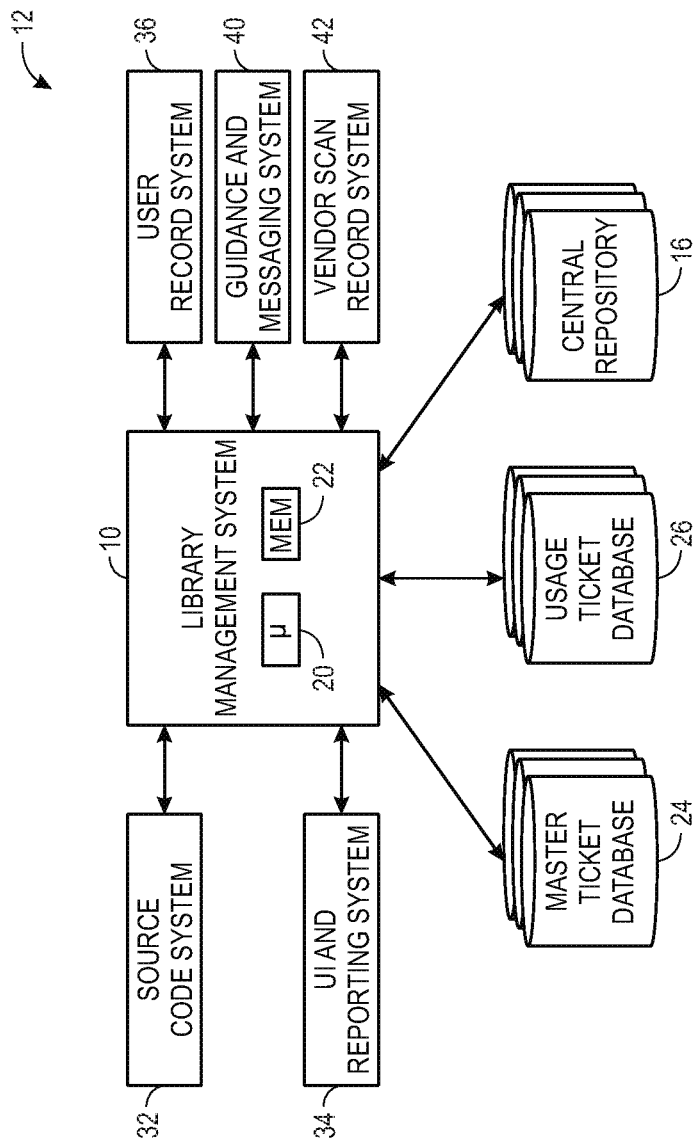
FIG. 1 is a block diagram of an embodiment of a third-party library management system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "third-party" refers to an entity separate and distinct from an enterprise and a platform on which its software developers operate. With this in mind, the term "third-party library" refers to a package or collection of software code that is developed by a third-party and made available freely or by licensing to the enterprise. For example, when applications are developed by third parties, the enterprise may acquire permission to use the application by requesting or purchasing a subscription, which can be a license for a particular number of users, which can expire after a certain term, or a combination thereof. Example embodiments of third-party libraries include compressed files, such as Java archive (JAR) files, ZIP files, Roshal Archive (RAR) files, or non-compressed collections of software artifacts, such as lines of Java or Javascript computer code.

As used herein, the term "software release" refers to a created or updated version of a software application. For example, a software application may include one or more features that are provided to a user or customer in the form of a software release. The features may be changes or additions (e.g., new versions) to the software application from a previous release or in a new product. Such features may include added or removed functionality, security updates, bug fixes, or the like. Upon making the desired changes to the software application, the software application may be provided to users through a release process. Moreover, the term "central repository" refers to a single database or a single repository of information in which software developers of an enterprise store third-party libraries. However, the central repository can be implemented using other database technologies, such as distributed database systems.

Embodiments of the present disclosure are directed to a library management system (e.g., third-party library management system) that analyzes source code to detect and control third-party libraries that software developers request to include within a software release. As noted above, an enterprise or other organization may develop and release various versions of an application for use on any suitable computing systems. In some cases, the enterprise may modify previous versions of an application to add or modify functionality, to resolve bugs or other error conditions, to optimize performance and/or resource utilization, and so forth. As described in detail below, to monitor the approval of particular third-party libraries for a software release in real-time, the library management system maintains a record of master tickets and a record of usage tickets. Generally, approved master tickets are indicative of whether a particular library is approved for universal use within an enterprise, and approved usage tickets are indicative of whether a particular library is approved for use within a particular software release or product of the enterprise.

After identifying a third-party library within source code or directly receiving a third-party library, the library management system detects any previous master ticket or usage ticket for the third-party library. If a master or usage ticket is not already existing and approved for the third-party library, the third-party library management system generates a master ticket request or usage ticket request and analyzes the third-party library to determine whether it meets multiple security and/or operational criteria. If the third-party library is not automatically approved by this process, the third-party library may undergo one or multiple manual approval processes to approve the requested master ticket or usage ticket. Thus, after approval of a master ticket, the third-party library may be incorporated into the central repository and referenced by subsequent usage tickets to approve the third-party library for incorporation in particular product releases. As described in more detail below, the third-party library management system enables the enterprise to efficiently secure and monitor its code base by these and other operations.

FIG. 1 is a block diagram of an embodiment of a third-party library management system, referred to herein as a library management system 10, in communication with a plurality of auxiliary systems and databases of a computing system 12. As noted above, the library management system 10 identifies, analyzes, and approves third-party libraries to be included in a central repository 16. The library management system 10 of the present embodiment includes one or more processors 20 and a memory 22 to facilitate performance of the steps disclosed herein. The one or more processors 20 may include one or more microprocessors capable of performing instructions stored in the memory 22. Additionally or alternatively, the one or more processors 20 may include application-specific integrated circuits (ASICs), field-programmable gate arrays (FPGAs), and/or other devices designed to perform some or all of the functions discussed herein without calling instructions from the memory 22. The memory 22 may include any tangible, non-transitory, and computer-readable storage media having machine-readable instructions stored thereon. Moreover, it is to be understood that the library management system 10 may additionally or alternatively include any other components suitable for controlling the central repository 16 and other components discussed herein. For example, the library management system 10 may include input devices, a power source, a network interface, a user interface, and/or other computer components useful in performing the functions described herein.

The central repository 16 of the present embodiment is a collection of development artifacts, such as native libraries and third-party libraries, which may be utilized in constructing versions of a software application for release. The central repository 16 may therefore be a centralized database or location in which lines of code, libraries, and the like are stored for later reference by software releases. In some embodiments, the central repository 16 is stored on one or more local or remote database servers that are stored, employed, and/or maintained on any suitable processor-based system.

The library management system 10 of the present embodiment is also in communication with a master ticket database 24 and a usage ticket database 26 of the computing system 12. The master ticket database 24 includes a collection of master tickets for third-party libraries that have been requested by software developers and/or that have been approved in response to the third-party libraries passing certain analysis procedures. For example, in some embodiments, a requested third-party library may be approved if the requested third-party library receives at least a threshold score and/or meets engineering, security, and legal specifications, as discussed in more detail below. The master ticket database 24 may therefore maintain a log of master tickets that have been requested, that have been approved, and/or that have been denied so that the library management system 10 may reference the master ticket database 24 to determine a current status of a particular master ticket and its corresponding third-party library. Once a master ticket for a requested third-party library is approved, the library management system 10 may store the requested third-party library in the central repository 16.

Similarly, the usage ticket database 26 includes a collection of usage tickets that each represents authorization to utilize a particular third-party library in a particular software release. The usage ticket database 26 maintains data regarding usage tickets that have been requested, have been approved, and/or have been denied according to the particular third-party library meeting certain criteria, discussed in more detail below. Because each usage ticket represents authorization to implement a particular third-party library within a specific product release, the usage ticket database 26 additionally stores data regarding with which master ticket a particular usage ticket is associated. In other embodiments, one or multiple of the central repository 16, the master ticket database 24, and the usage ticket database 26 may be stored within the memory 22 of the library management system 10. Additionally, in some embodiments, the central repository 16, the master ticket database 24, and the usage ticket database 26 may be combined into one or more databases or repositories that are accessible by the library management system 10 and user devices of software developers.

The library management system 10 may additionally be communicatively coupled to certain external systems of the computing system 12 that provide further information to the library management system 10 for enabling enhanced detection and management of third-party libraries. For example, the library management system 10 is communicatively coupled to a source code system 32 in the present embodiment, which enables software developers to seamlessly request to incorporate identified source code from the source code system 32 into a software release. In such embodiments, the software developers may identify third-party libraries in the source code system 32 and request to incorporate the third-party libraries via the source code system 32. For example, in some embodiments, the source code system 32 may be GIT®, maintained by Junio Hamano of California, U.S., and available at https://git-scm.com/.

The library management system 10 of the present embodiment is also communicatively coupled to a user interface (UI) and reporting system 34. The UI and reporting system 34 enables users to provide inputs and requests via any suitable user devices to the library management system 10, which may provide any suitable information, query results, and/or reports in response, as discussed in more detail below with reference to FIG. 8. In some embodiments, the UI and reporting system 34 includes a buildtools feature that is available to a software developer after log-in credentials are received and approved.

In the illustrated embodiment, the library management system 10 is communicatively coupled to a user record system 36 to collect user information therefrom. By cooperating with the user record system 36, the library management system 10 may identify and record user information, or committer details, regarding which software developer is requesting to incorporate a particular third-party library in a software release. For example, the user record system 36 may be WORKDAY®, as headquartered in Pleasanton, Calif., in some embodiments.

The computing system 12 of the present embodiment also includes a guidance and messaging system 40 communicatively coupled to the library management system 10 to enable the library management system 10 to intelligently interact with users. For example, the guidance and messaging system 40 may include any suitable chatbot or artificial intelligence system that provides direction to and responds to questions from a user accessing the library management system 10. By interacting with the guidance and messaging system 40, users may more efficiently and accurately provide inputs to the library management system 10, improving operation of the computing system 12 by properly prompting users to decrease submittal of incorrect or incomplete ticket requests.

Moreover, the computing system 12 presently includes a vendor scan record system 42 that may supplement operation of the library management system 10. The vendor scan record system 42 may periodically scan the code base of the enterprise to identify third-party libraries for which a master ticket or usage ticket has not been generated. If identified, the third-party libraries may then be provided to the library management system 10 to request approval of the appropriate tickets. In some embodiments, the vendor scan record system 42 may perform scans only after a software release is fully developed or upon user request, because a vendor fee is incurred for each scanning operation performed. However, the vendor scan record system 42 may be utilized to supplement or verify the real-time operation of the library management system 10, thus providing additional security and operational benefits to the computing system 12 having both the library management system 10 and the vendor scan record system 42. In some embodiments, the vendor scan record system 42 is PALAMIDA®, as headquartered in San Francisco, Calif.

Figure 2:
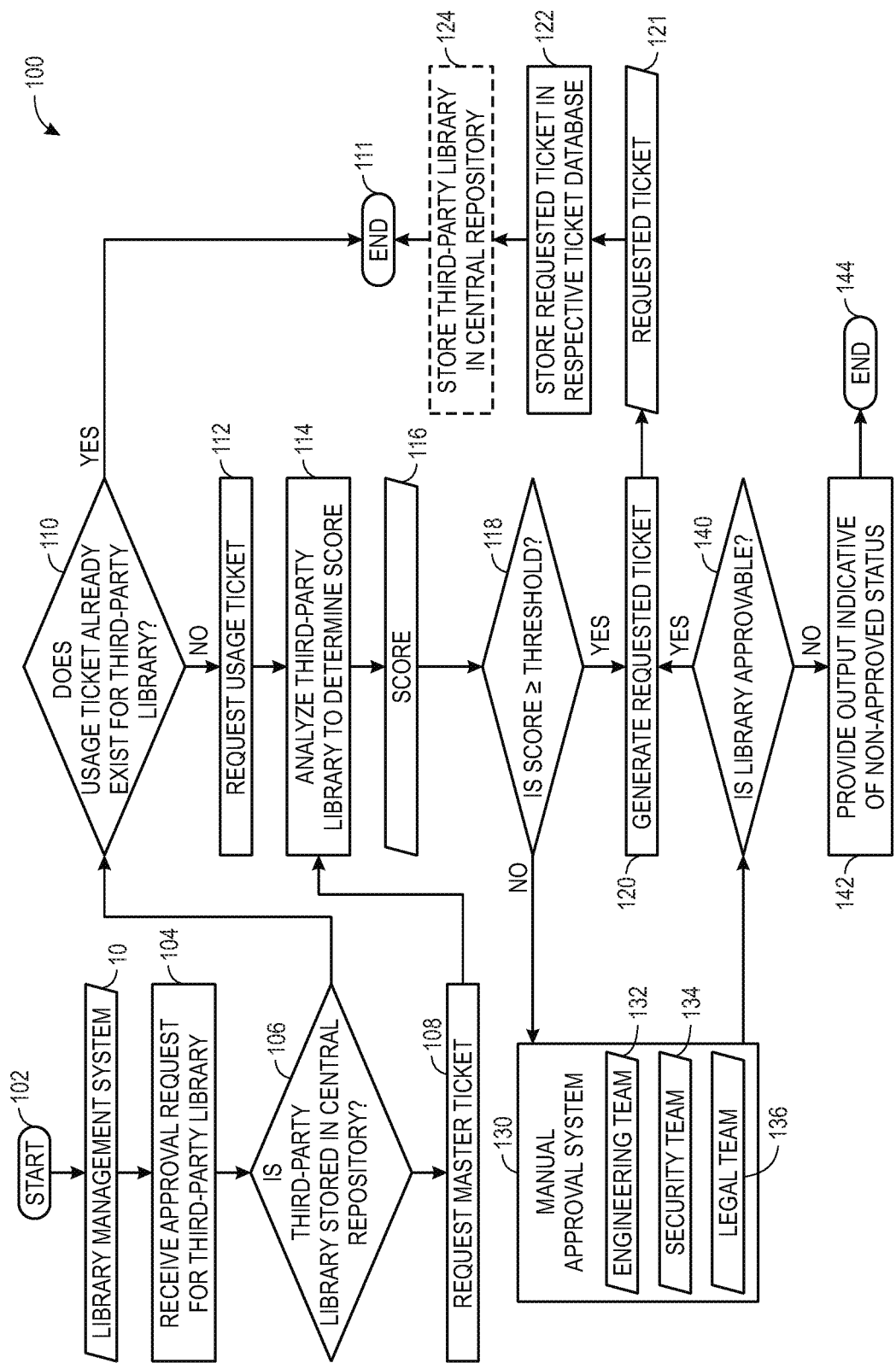
FIG. 2 is a flow diagram of an embodiment of a process for controlling a central repository via the third-party library management system, in accordance with aspects of the present disclosure.

With the above understanding of the computing system 12 in mind, the following discussion regarding operation of the library management system 10 to secure the code base of an enterprise may be more readily understood. Indeed, FIG. 2 is a flow diagram of an embodiment of a process 100 for controlling the central repository 16 via the library management system 10, in accordance with aspects of the present disclosure. The steps illustrated in the process 100 are meant to facilitate discussion and are not intended to limit the scope of this disclosure, because additional steps may be performed, certain steps may be omitted, and the illustrated steps may be performed in an alternative order or in parallel, where appropriate. The process 100 may be implemented by the library management system 10 via the one or more processors 20, hereinafter referred to as the processor 20 for simplicity. However, in other embodiments, the library management system 10 may implement the process 100 via any suitable device, client instance, network, cloud-based platform, or a combination thereof.

To start (block 102) the process 100, the processor 20 of the library management system 10 receives (block 104) an approval request to incorporate a third-party library in a software release. The approval request may be received as an explicit request for a master ticket or usage ticket through the UI and reporting system 34, in some embodiments. Alternatively, the library management system 10 may receive a set of source code via the source code system 32 or a user device and analyze the set of source code to detect a third-party library and generate the approval request therefrom. Moreover, the library management system 10 may actively monitor the code base of the enterprise to independently identify newly-included or requested third-party libraries, in some embodiments.

With the third-party library identified, the processor 20 may determine (block 106) whether the third-party library is stored in the central repository 16. For example, the library management system 10 may query the central repository 16 based on the third-party library. In some embodiments, the library management system 10 may also analyze the third-party library to ascertain identifiers or characteristics for the third-party library, and then query the central repository 16 based on the identifiers. The identifiers of the third-party library may include a name, a publisher, a function, and so forth of the third-party library. In some of these embodiments, the library management system 10 may therefore query the central repository 16 based on the identifiers to determine if a stored third-party library corresponds to a threshold number of the identifiers. The library management system 10 may therefore detect a substantially similar third-party library, deny the current approval request, and conserve processing resources by reducing approval requests for duplicate libraries. In some embodiments, in response to detecting a substantially similar third-party library in the central repository 16, the library management system 10 may determine whether a usage ticket has already been requested for the substantially similar third-party library with the same software release, and provide information regarding the usage ticket in response to determining the usage ticket is already requested.

As noted above, the third-party library may be stored in the central repository 16 after the third-party library is associated with an approved master ticket. As such, in addition or alternative to the determination of block 106, the processor 20 of the library management system 10 may determine whether a master ticket exists for the third-party library by querying the master ticket database 24, in some embodiments. In any case, in response to determining at block 106 that the third-party library is not stored in the central repository 16, the processor 20 requests (block 108) a master ticket for the third-party library. As noted above, the master ticket is indicative of universal approval of the third-party library for incorporation within each software release by the enterprise.

Alternatively, in response to determining at block 106 that the third-party library is stored in the central repository 16, the processor 20 determines (block 110) whether a usage ticket already exists for the third-party library. This determination enables the library management system 10 to end (block 111) the process 100 in response to detecting the existence of a usage ticket for the third-party library, efficiently conserving processing power by omitting the remaining steps of the process 100. In some embodiments, the library management system 10 may permit multiple usage ticket requests for a single third-party library, provided that the additional requests have a different requestor, stem from a different section of the enterprise, and so forth. Otherwise, in response to determining that a usage ticket does not already exist for the third-party library, the processor 20 requests (block 112) a usage ticket for the third-party library. In such cases, the library management system 10 may recognize that a corresponding master ticket is already approved for the third-party library, such that the user is now requesting authorization to incorporate the third-party library in a specific software release by the enterprise.

With the appropriate ticket requested, the processor 20 analyzes (block 114) the third-party library to determine a score 116 thereof. The analysis may include machine learning to compare features of already-approved third-party libraries in the central repository 16 to features of the requested third-party library. For example, if each third-party library in the central repository 16 includes certain licensing language, includes certain security protocols, includes certain first coding features, and/or excludes certain second coding features, the library management system 10 may score the third-party library based on a correspondence to these features. In some embodiments, the score 116 is selected from a scale of integers between 0 and 1, between 1 and 5, between 1 and 10, and so forth, with one end of the number range representing a greater correspondence to third-party libraries of the central repository 16.

The analysis of block 114 may additionally identify dependencies or hierarchical relationships between the requested third-party library and other libraries. For example, if the requested third-party library implements an already-approved third-party library in its operation, the library management system 10 may determine that the requested third-party library depends from the already-approved third-party library, and further, store data or identifiers representative of this relationship as an entry in the central repository 16. In this manner, the library management system 10 enables the code base of the enterprise to be cataloged for relationship information, facilitating efficient and appropriate licensing of the code base. In some embodiments, the score 116 of the third-party library may be influenced by the relationships identified for the third-party library, such that the third-party library receives a higher score 116 if it references already-approved third-party libraries than it would if it references no libraries or non-approved libraries. In some embodiments, in response to detecting that the third-party library includes a full version of a particular third-party library that is already stored in the central repository 16, the library management system 10 may parse or edit the third-party library to replace the particular third-party library with a reference or call to the location of the particular third-party library in the central repository 16. This editing may desirably reduce duplication of information in the central repository 16 to enable the enterprise to develop a more efficient and compact software release.

Moreover, the analysis of block 114 may identify and track committer information regarding the third-party library to influence the score 116 of the third-party library. In some embodiments, the committer information includes identification of a user that requested incorporation of the third-party library, a team or role of the user within the enterprise, a level of experience of the user, and so forth. In such embodiments, the library management system 10 may associate the third-party library with a higher score 116 if the user or committer has more experience, has a higher role, is associated with a particular team, and so forth than third-party libraries without similar committer information.

The processor 20 following process 100 also determines (block 118) whether the score 116 is equal to or greater than a threshold score. The threshold score may be any suitable predetermined value indicative of a third-party library that meets or exceeds preferred characteristics of the code base of the enterprise. For example, in embodiments in which the score 116 is set as a value within a range of 1 to 5, the threshold score may be set as 3. The determination of block 118 may be performed by any suitable comparator elements or features of the processor 20. Additionally, in other embodiments, the processor 20 may combine blocks 114 and 118 into a single binary step in which the processor 20 determines whether the third-party library meets predetermined qualifications set for third-party libraries.

Continuing through the process 100, in response to determining that the score 116 is greater than or equal to the threshold score, the processor 20 generates (block 120) a requested ticket 121 for the third-party library, thus approving it for incorporation within the code base of the enterprise. The processor 20 then stores (block 122) the requested ticket in the respective ticket database. That is, if a usage ticket was requested at block 112, the processor 20 stores the requested usage ticket in the usage ticket database 26 at block 122. Because the corresponding third-party library is already stored in the central repository 16, the process 100 may end (block 111) after storing the usage ticket in the usage ticket database 26, signaling to the requestor that the third-party library is authorized for incorporation within the specific product release. In some embodiments, the processor 20 may update a parameter indicative of the status of the requested usage ticket to be approved.

Similarly, if a master ticket was requested at block 108, the processor 20 stores the requested master ticket in the master ticket database 24 at block 122. In some embodiments, the processor 20 may also update a parameter indicative of the status of the requested master ticket to be approved. After storing the master ticket in the master ticket database 24, the process 100 may include the processor 20 storing (block 124) the third-party library in the central repository 16 to end (block 111) the process 100. Accordingly, the library management system 10 having the processor 20 that follows the process 100 may efficiently identify acceptable third-party libraries to proficiently manage the central repository 16 of the enterprise.

Alternatively, in response to determining at block 118 that the score 116 is not greater than or equal to the threshold score, the processor 20 may transmit the third-party library to a manual approval system 130. In the illustrated embodiment, the manual approval system 130 includes an engineering team 132, a security team 134, and a legal team 136. Each team 132, 134, 146 may manually review the third-party library to determine whether the third-party library meets respective target qualifications set forth for each third-party library. For example, the engineering team 132 may verify whether the third-party library includes operational software features that perform one or more suitable processing operations. The security team 134 may verify whether the third-party library is free of malicious or vulnerable lines of code. Similarly, the legal team 136 may verify whether the third-party library includes appropriate legal language and/or whether the enterprise possesses a suitable license to utilize the third-party library. In other embodiments, the manual approval system 130 may include any other suitable teams, in addition or in alternative to the illustrated teams 132, 134, 146, to facilitate manual evaluation of the third-party library. The manual approval system 130 thus analyses multiple aspects of the third-party library and provides results of this analysis to the processor 20 of the library management system 10. In some embodiments, the third-party library is approved by the manual approval system 130 when each team 132, 134, 146 approves of the third-party library, though in other embodiments, a threshold number of the teams 132, 134, 146 may provide approval that results in overall approval of the third-party library.

Accordingly, after receiving feedback from the manual approval system 130, the processor 20 determines (block 140) whether the third-party library is approvable. For example, in situations in which the manual approval system 130 determines that the third-party library meets desired specifications, the processor 20 may receive input from the manual approval system 130 indicative of the manual approval and therefore determine that the third-party library is approvable. In response to determining that the third-party library is approvable, the processor 20 may generate (block 120) the requested ticket 121 for the third-party library and proceed to block 122, as discussed above.

Alternatively, in response to receiving feedback from the manual approval system 130 indicating that the third-party library is not approvable, the processor 20 may provide (block 142) output indicative of a non-approved status of the third-party library, thus ending (block 144) the process 100. The output may additionally identify suggested modifications or corrective actions that may improve the acceptability of the third-party library. For example, the output may specify that certain portions of the third-party library should be removed or that a license should be obtained for the third-party library. As discussed in more detail below, the non-approved status of the third-party library may be provided to users via any suitable manner, such as a periodic reporting message transmitted to a user device.

Accordingly, use of the library management system 10 to pre-process third-party libraries to rapidly identify any third-party libraries suitable for incorporation within a product release may alleviate work that is otherwise performed by the manual approval system 130. Software developers may therefore receive authorization to incorporate requested third-party libraries in software releases more rapidly and uniformly than software developers without the library management system 10 or software developers with library management procedures that rely on subjective human analysis.

Figure 3:
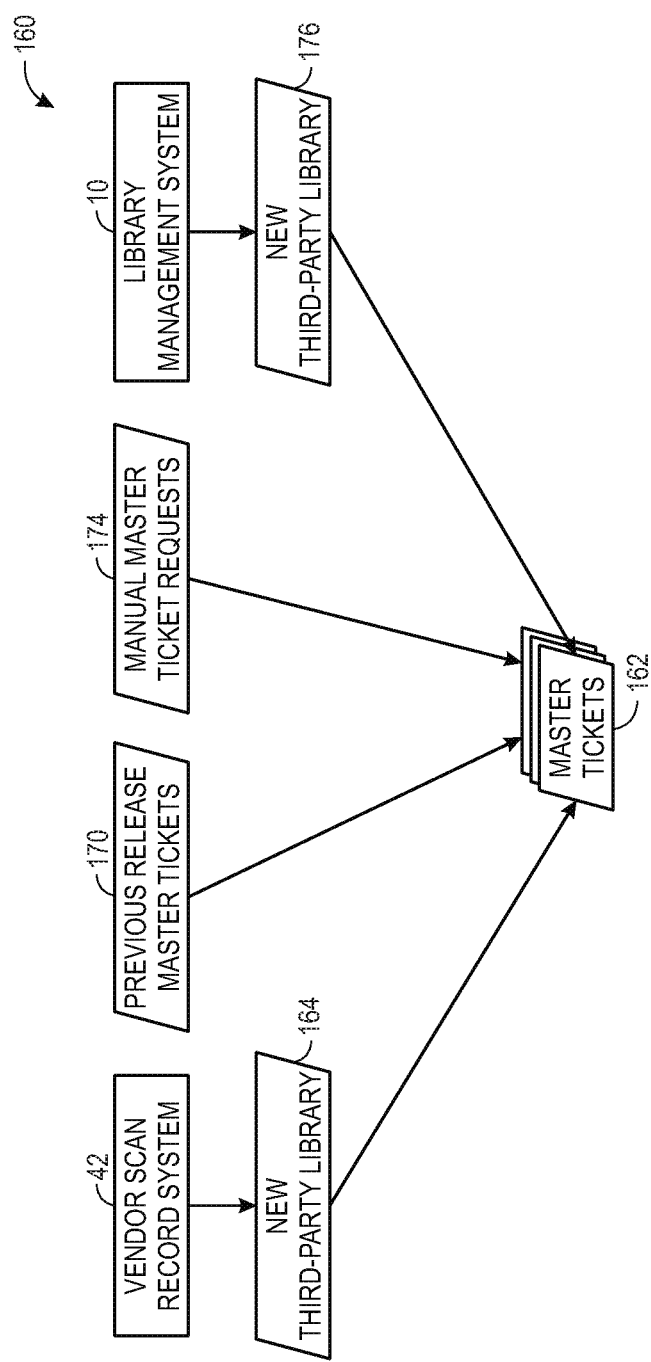
FIG. 3 is a schematic diagram of an embodiment of a software control system in which the third-party library management system is integrated, in accordance with aspects of the present disclosure.

Moreover, the library management system 10 may be integrated with existing code management procedures to further enhance approval of appropriate third-party libraries. For example, FIG. 3 is a schematic diagram of an embodiment of a software control system 160 in which the third-party library management system 10 may be integrated, in accordance with aspects of the present disclosure. Generally, the software control system 160 illustrates multiple sources from which master tickets 162 may originate. Indeed, because software development may be a continuously-occurring process orchestrated by multiple entities, the illustrated integration of the library management system 10 into the software control system 160 provides a convenient, efficient manner for generation of master tickets 162 as software versions are developed. It should be understood that usage tickets may be similarly gathered from these or other sources, in other embodiments.

In the illustrated embodiment, the software control system 160 includes the vendor scan record system 42 introduced above. When actuated, the vendor scan record system 42 may identify a new third-party library 164 within source code of the enterprise. The vendor scan record system 42 may therefore request a master ticket 162 for the new third-party library 164, which if approved by the library management system 10, the library management system 10 then stores in the central repository 16. However, the vendor scan record system 42 alone may incur a cost for each scan performed, and additionally, may be performed after a software release is developed, potentially slowing the software release if a missing license or requested modification to the third-party library is identified.

Moreover, the software control system 160 may inherit or obtain previous release master tickets 170 from a previous release of the software. In such embodiments, the previous release master tickets 170 may be automatically carried over to the new release and stored in the master ticket database 24, with their corresponding third-party libraries remaining in the central repository 16. In other embodiments, the previous release master tickets 170 may be treated as requested master tickets that are processed by the library management system 10 according to the process 100 of FIG. 2. In these embodiments, the corresponding third-party libraries may be deleted from or quarantined within the central repository 16 unless the previous release master tickets 170 are re-approved.

In certain embodiments, the software control system 160 also receives manual master ticket requests 174 directly from a user. For example, the user may provide the manual master ticket request 174 directly to the manual approval system 130, in some embodiments. Upon approval of one or more of the manual master ticket requests 174, the software control system 160 or the library management system 10 thereof stores the one or more master tickets 162 in the master ticket database 24 and stores the one or more corresponding third-party libraries in the central repository 16.

Further, as discussed above, the library management system 10 may identify a new third-party library 176 to generate and approve a master ticket 162. The master ticket 162 is stored in the master ticket database 24 with the master tickets 162 provided by the other components of the software control system 160, thus providing a comprehensive and modular process for securing the code base of the enterprise. In other words, the library management system 10 may be retrofit into existing library controlling processes of the enterprise to provide additional security and efficiency benefits for identifying and approving third-party libraries for various software releases.

Figure 4:
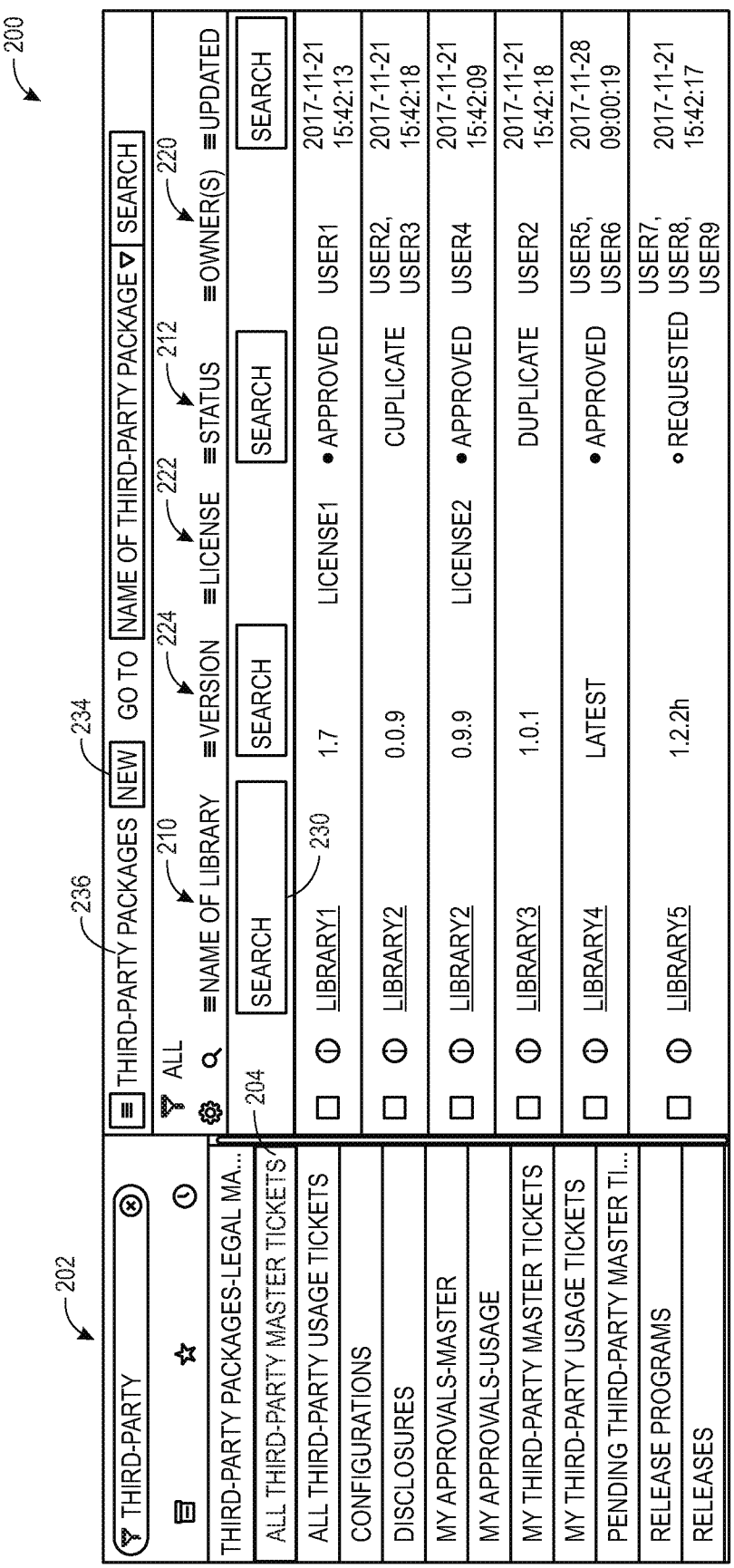
FIG. 4 is a screenshot of an embodiment of a user interface for creating new master tickets via the third-party library management system, in accordance with aspects of the present disclosure.

To help demonstrate details of the master tickets and user tickets, FIGS. 4-7 are example views of certain screenshots of an implementation of the present approach as pertains to master tickets and user tickets. For example, as shown, FIG. 4 is a screenshot of an embodiment of a user interface 200 for creating new master tickets via the library management system 10, in accordance with aspects of the present disclosure. In some embodiments, the user interface 200 is a screen that is displayed on a suitable client device after a user accesses the library management system 10. In the illustrated embodiment, the user interface 200 includes a sidebar 202 from which the user may select an all third-party master tickets button 204. When the all third-party master tickets button 204 is selected, the user interface 200 displays the third-party libraries 210 for which master tickets have been requested and the corresponding status 212 of their respective master ticket in a tabular format. For example, a "Library1" third-party library has an "Approved" status, and a "Library5" third-party library has a "Requested" status. Moreover, a first "Library2" third-party library has an "Approved" status, while a second "Library2" third-party library has a "Duplicate" status, indicating that the second "Library2" third-party library will not be stored in the central repository 16 because a substantially similar or identical third-party library is already stored in the central repository 16.

The user interface 200 of the library management system 10 may additionally include an Owner(s) column 220 indicating the owners or committers of each requested master ticket, thereby facilitating tracking of users that have submitted the third-party libraries for incorporation in a software release. Such tracking may desirably improve an efficiency for maintaining contact with users responsible for a particular third-party library, as may be particularly useful in situations in which changes are to be made to the third-party library before an approved status is granted. The user interface 200 may also include a License column 222 that provides information regarding whether a requested third-party library is associated with a license. In other embodiments, the License column 222 may also indicate a current status of a license request or that a license is recommended. A Version column 224 additionally illustrates what version of a third-party library is associated with each given master ticket request. A search bar 230 may further enable a user to locate a previously-requested master ticket. It should be understood that the user interface 200 may be customizable and take any suitable, user-requested form. For example, in other embodiments, additional columns detailing a date-time at which a master ticket was generated, a last access time, a last user that accessed the master ticket, and so forth may be included in the user interface 200.

Figure 5:
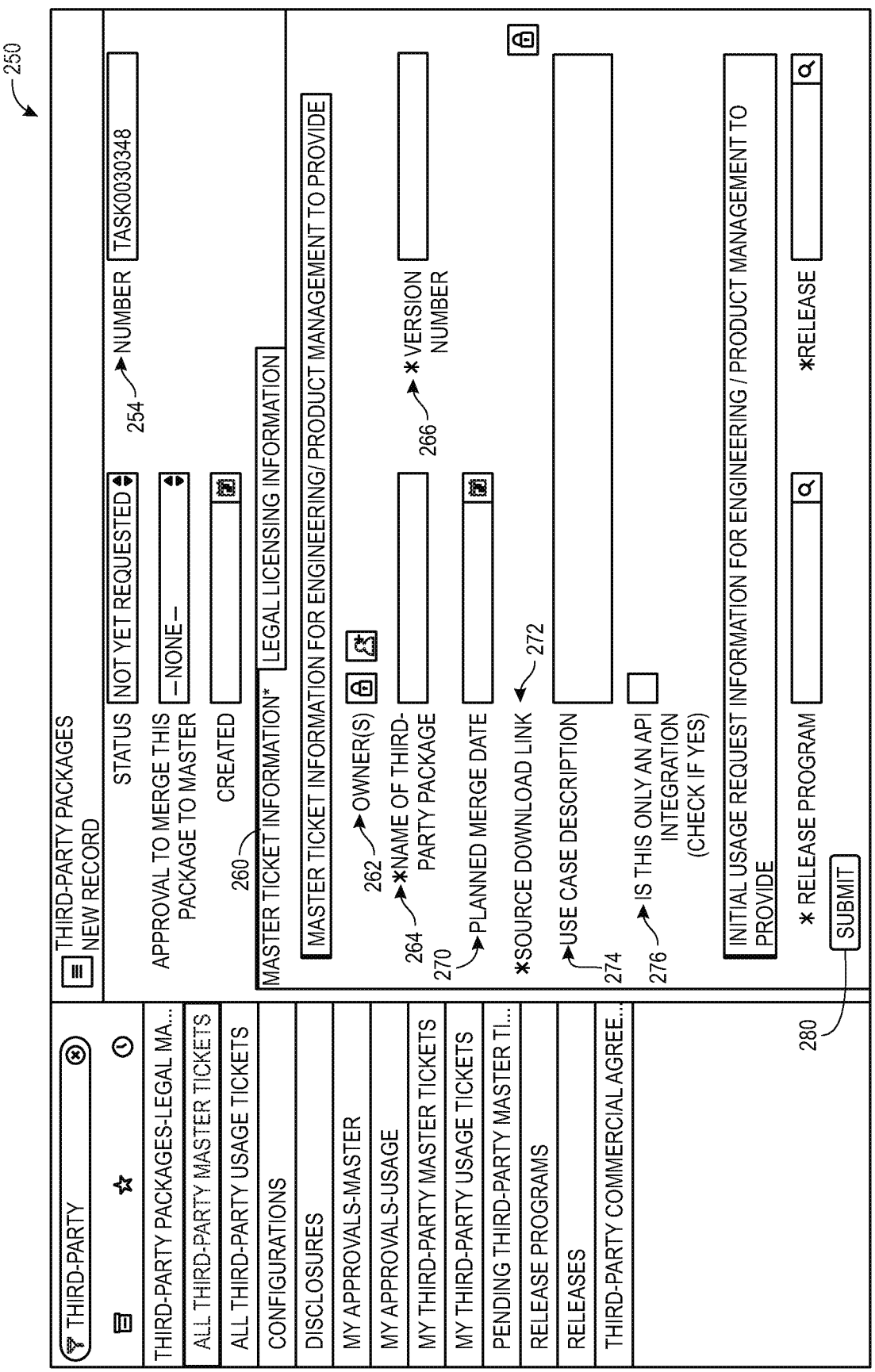
FIG. 5 is a screenshot of an embodiment of a detailed view of a master ticket, in accordance with aspects of the present disclosure.

To generate a new master ticket request, a user may select a "New" button 234 on a top bar 236 of the user interface 200, opening a user interface 250 of FIG. 5. Turning now to FIG. 5, FIG. 5 is a screenshot of an embodiment of a detailed view of a master ticket request within the user interface 250, in accordance with aspects of the present disclosure. In the present embodiment, the user interface 250 includes an identification number field 254, indicating that the present master ticket request is assigned TASK0030348. The screenshot also illustrates fields of the user interface 250 that a user may complete to request the master ticket. For example, a Master Ticket Information tab 260 includes additional fields in which the user may supply required information regarding the third-party library for which the master ticket is requested. In particular, the user may complete an Owner field 262 of the master ticket, a name field 264 of the third-party package or library, a version number field 266 of the third-party library, a planned merge date field 270 for including the third-party library in a software release, a source download link field 272, and a use case description field 274, as well as an application programming interface (API) check box 276 indicating whether the request is for an API integration. After filling required fields denoted by an asterisk, the user may select a submit button 280 to enter the master ticket request for consideration by the library management system 10. In some embodiments, the user may also complete a Legal Licensing Information tab 282 to provide information regarding any licensing information that is obtained or required for the third-party library.

Figure 6:
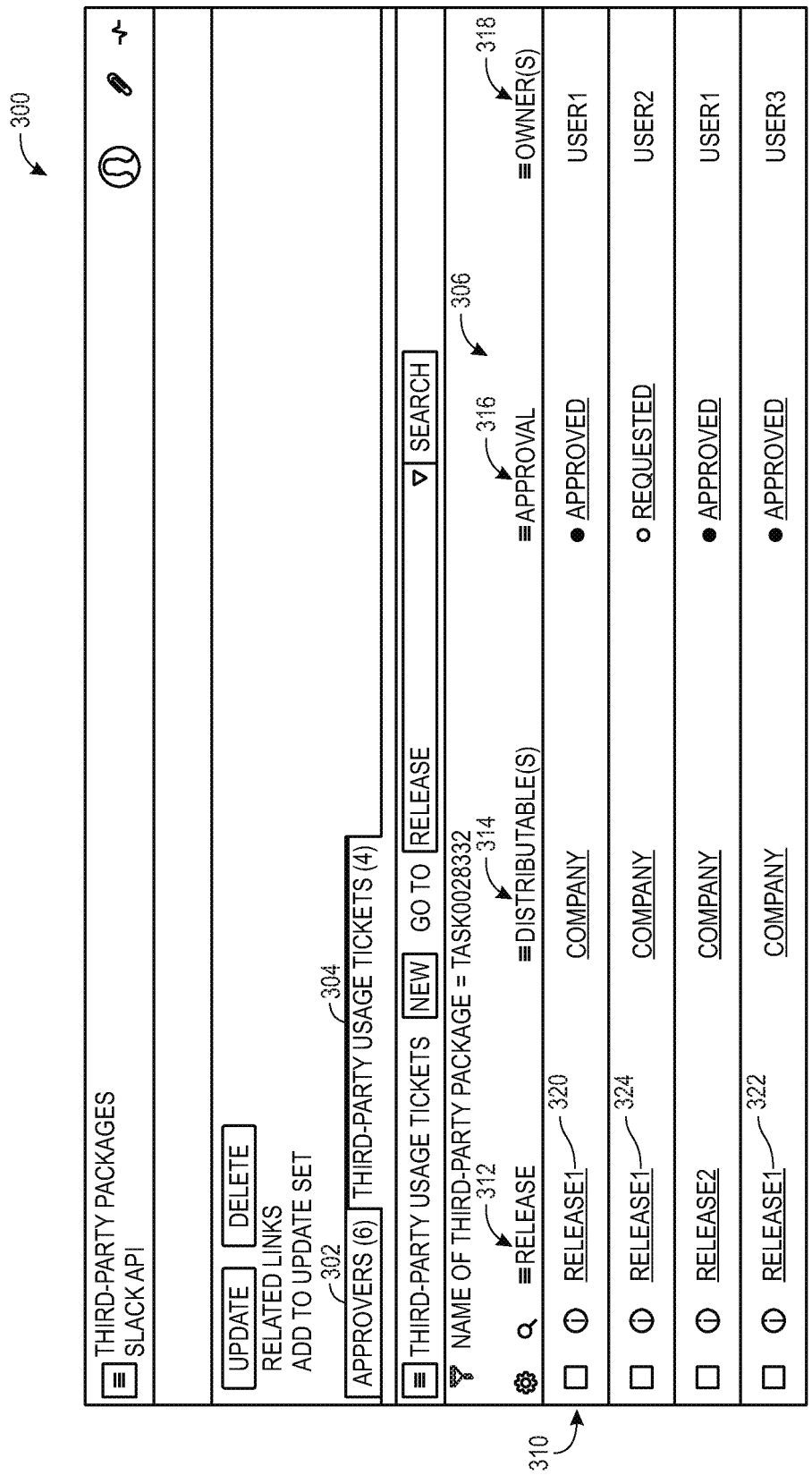
FIG. 6 is a screenshot of an embodiment of a user interface for creating new usage tickets via the third-party library management system, in accordance with aspects of the present disclosure.

FIG. 6 is a screenshot of an embodiment of a user interface 300 for creating new usage tickets via the library management system 10, in accordance with aspects of the present disclosure. As shown, the user interface 300 includes an Approvers tab 302 that details which users are authorized to manually approve usage tickets. Moreover, a Third-party Usage Tickets tab 304 includes a usage ticket table 306 in which rows 310 are particular usage tickets associated with the a master ticket having the identification number TASK0028332. That is, the master ticket TASK0028332 of the present embodiment is tied to four usage tickets. In the illustrated embodiment of the user interface 300 the usage ticket table 306 includes a Release column 312, a Distributable(s) column 314, an Approval column 316, and an Owner(s) column 318. For example, a first usage ticket 320 for Release 1 made by User 1 and a fourth usage ticket 322 for Release 1 made by User 3 are approved, while a second usage ticket 324 for Release 1 made by User 1 is requested but not approved. In certain embodiments, the second usage ticket 324 may be denied because the first usage ticket 320 and the fourth usage ticket 322 are already approved, thereby already authorizing incorporation of the associated third-party library in Release 1. User 1 has also requested to incorporate the third-party library in Release 2, illustrating that the same approved master ticket may be tied to multiple software releases.

Figure 7:
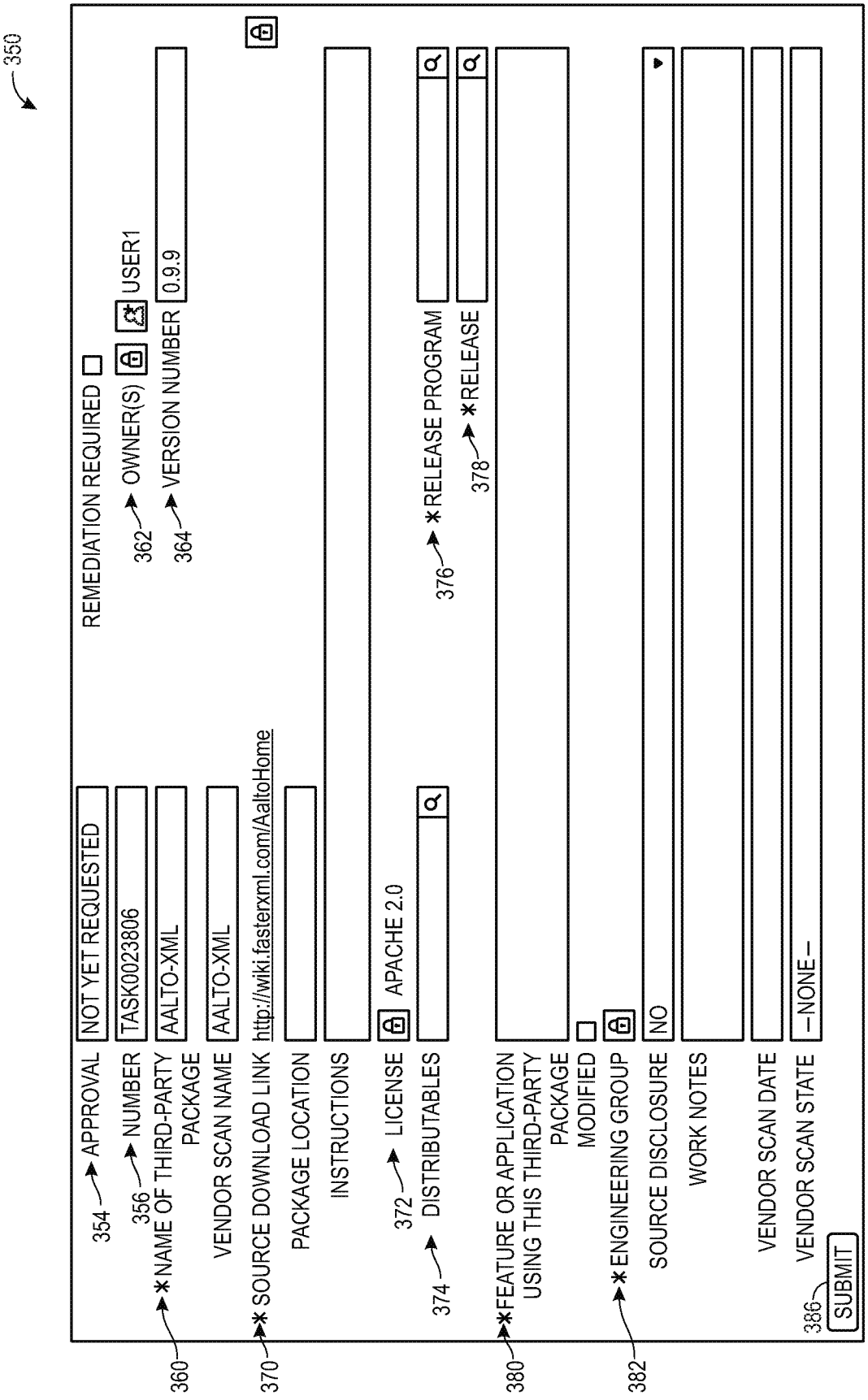
FIG. 7 is a screenshot of an embodiment of a detailed view of a usage ticket, in accordance with aspects of the present disclosure.

Moreover, to submit a new usage ticket request, a user may select a New button 330 of the Third-party Usage Tickets tab 304, launching a user interface 350 of FIG. 7. For example, FIG. 7 is a screenshot of an embodiment of a detailed view of a usage ticket within the user interface 350 in accordance with aspects of the present disclosure. Similar to the user interface 250 of FIG. 5, the present embodiment of the user interface 350 includes multiple fields that a user may complete to request the usage ticket. Indeed, an approval field 354 indicates that the current usage ticket is Not Yet Requested. An identification number field 356 shows that the current usage ticket is assigned TASK0023806 for identification. Moreover, a name field 360, an owner field 362, and a version number field 364 may be completed for the third-party library. The user may also fill a source download link 370, a license field 372, a distributable field 374, a release program field 376, a release field 378, a features field 380, and an engineering group field 382 associated with the third-party library. It should be noted that any other suitable fields, including those related to the vendor scan record system 42, may be included in the detailed view of the usage ticket request. Once all required fields, as denoted by an asterisk, are completed, the user may select a submit button 386 to instruct the library management system 10 to analyze the third-party library according to the process 100 of FIG. 2.

Figure 8:
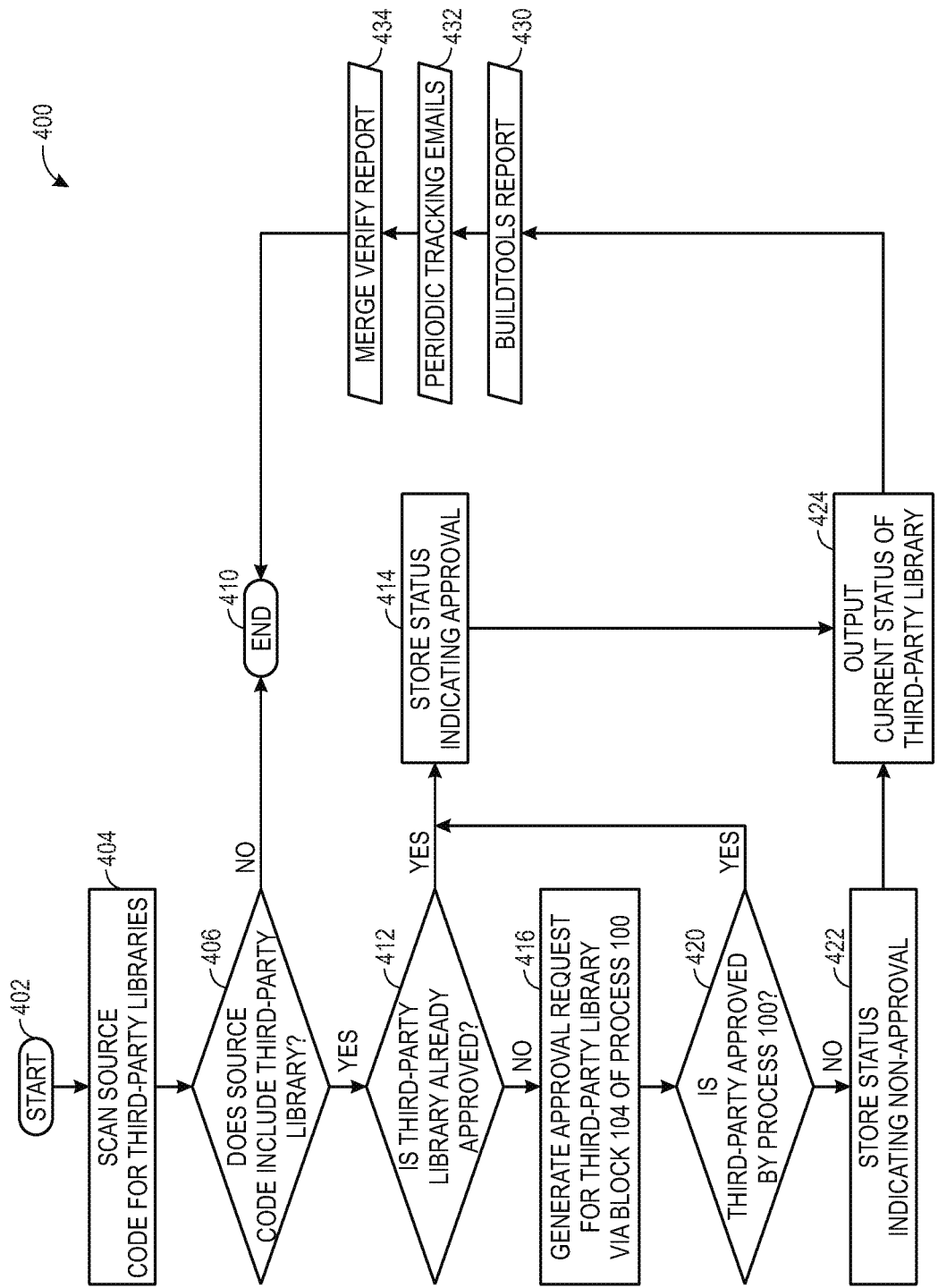
FIG. 8 is a flow diagram of an embodiment of a process for approving and reporting third-party libraries via the third-party library management system, in accordance with aspects of the present disclosure.

As mentioned above, the library management system 10 facilitates efficient monitoring and reporting of third-party libraries of the enterprise. For example, FIG. 8 is a flow diagram of an embodiment of a process 400 for reporting statuses of third-party libraries via the library management system 10, in accordance with aspects of the present disclosure. The steps illustrated in the process 400 are meant to facilitate discussion and are not intended to limit the scope of this disclosure, because additional steps may be performed, certain steps may be omitted, and the illustrated steps may be performed in an alternative order or in parallel, where appropriate. The process 400 may be implemented by the processor 20 of the library management system 10, in some embodiments. In other embodiments, the library management system 10 may implement the process 400 via any suitable device, client instance, network, cloud-based platform, or a combination thereof.

To start (block 402) the process 400, the processor 20 of the library management system 10 scans (block 404) source code submitted to or located by the library management system 10 for third-party libraries. For example, if a user submits a set of source code to the library management system 10 from the source code system 32 or a local development platform of a user device, the library management system 10 may scan the set of source code to detect any third-party libraries. That is, based on the set of source code, the processor 20 determines (block 406) whether any third-party libraries are included in or referenced by the set of source code. In response to determining that a third-party library is not included in the set of source code, the processor 20 may end (block 410) the process.

Alternatively, in response to determining that a third-party library is included in the set of source code, the processor 20 of the library management system 10 determines (block 412) whether the third-party library is already approved. In other words, the library management system 10 determines whether a master ticket and a usage ticket already exist for the third-party library. In response to determining that the third-party library is already approved, the processor 20 may store (block 414) a status indicating that the third-party library is approved.

In response to determining that the third-party library is not already approved, the processor 20 generates (block 416) an approval request for the third-party library, such as by proceeding to block 104 of process 100 of FIG. 2. The processor 20 following the process 400 then determines (block 420) whether the third-party library has been approved by the process 100 of FIG. 2. Accordingly, in response to determining that the third-party library is approved, the processor 20 may store (block 414) a status indicating that the third-party library is approved, as mentioned above. Alternatively, in response to determining that the third-party library is not approved, the processor 20 may store (block 422) a status indicating that the third-party library is not approvable.

Figure 11:
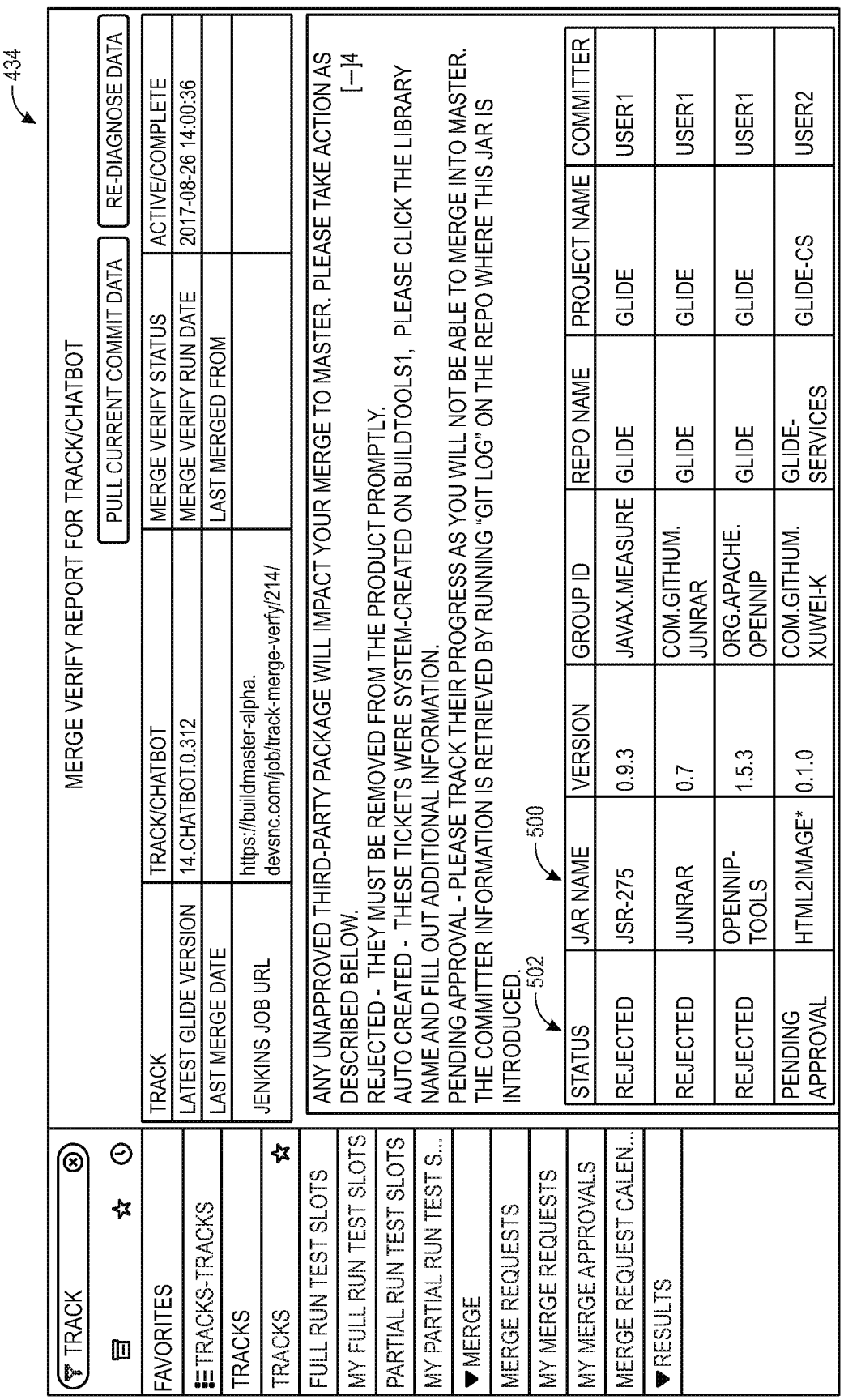
FIG. 11 is a screenshot of an embodiment of a merge verify report generated by the third-party library management system, in accordance with aspects of the present disclosure.

In any case, based on the stored indications, the processor 20 of the library management system 10 may output (block 424) the current status of the third-party library. In the current embodiment of the process 400, the output of block 424 includes a buildtools report 430, periodic tracking emails 432, and a merge verify report 434, each of which are described in more detail below. In particular, an example of the buildtools report 430 is illustrated in FIG. 9, an example of the periodic tracking emails 432 is illustrated in FIG. 10, and an example of the merge verify report 434 is illustrated in FIG. 11. In other embodiments, any other suitable reporting functions or processes may be performed to inform users of the statuses of requested third-party libraries. Accordingly, after the appropriate outputs are provided, the process 400 ends (block 410). Moreover, the process 400 may be repeated for each third-party library identified in the set of source code.

Looking now to examples of the reporting functions of the library management system 10, FIG. 9 is a screenshot of an embodiment of a buildtools report 430 generated by the library management system 10, in accordance with aspects of the present disclosure. In general, a user may access a buildtools report 430 on demand via the UI and reporting system 34. In the present embodiment of the buildtools report 430, the library management system 10 enables the user to select filters such as a category 450, a branch 452 or department of the enterprise, as well as a build 454 of the software to receive a targeted selection of statuses for third-party libraries particular to these filters. Indeed, the buildtools report 430 includes a status 460, a name 462, a version 464, as well as other information for each third-party category that aligns with the selected filters. As such, the library management system 10 enables the user to actively receive status information regarding the third-party libraries in real-time via the buildtools report 430.

FIG. 10 is a screenshot of an embodiment of a periodic tracking email 432 generated by the library management system 10, in accordance with aspects of the present disclosure. Based on the stored statuses of each requested third-party library, the library management system 10 may push a relevant embodiment of the periodic tracking email 432, including names 480 and statuses 482 of the third-party libraries, to appropriate recipients 484 at a predetermined time. For example, the periodic tracking email 432 may be transmitted at 3:00 pm every day or every week, thus apprising the recipients 484 of the status of the relevant third-party libraries to improve development of the associated software release. Additionally, FIG. 11 is a screenshot of an embodiment of a merge verify report 434 generated by the library management system 10, in accordance with aspects of the present disclosure. The merge verify report 434 may similarly provide the names 500 and statuses 502 of third-party libraries analyzed by the library management system 10 based on particular requests.

As discussed herein, a library management system 10 maintains a central repository 16 including third-party libraries that are approved for use within an enterprise, as well as ticket databases that indicate particular approvals for the third-party libraries. In particular, a master ticket database 24 includes master tickets that approve the third-party libraries for use within the enterprise, and a usage ticket database 26 includes usage tickets that approve the third-party libraries for use within a particular software release of the enterprise. The library management system 10 requests and approves master tickets for third-party libraries based on their correspondence to libraries already stored within the central repository 16. As such, upon approval of its master ticket, a particular third-party library may be stored within the central repository 16. Then, as software developers request to incorporate third-party libraries within a particular software release, the library management system 10 reanalyzes the third-party libraries and approves usage tickets for the third-party libraries. As such, the library management system 10 may efficiently analyze the code base of an enterprise in real-time to improve identification and approval of third-party libraries for a plurality of software releases, providing cost and processing power improvements to the enterprise.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium comprising machine-readable instructions, wherein the machine-readable instructions, when executed by one or more processors, cause the one or more processors to perform operations comprising:
   receiving a first approval request to incorporate a third-party library within a first software release;
   determining that the third-party library is not stored within a central repository comprising a plurality of approved third-party libraries;
   requesting a master ticket for the third-party library, wherein the master ticket is indicative of universal approval of the third-party library for incorporation within a plurality of software releases comprising the first software release;
   determining a score of the third-party library based on characteristics of the third-party library, wherein the score comprises a numeric value;
   receiving the master ticket in response to determining that the score is above a threshold score; and
   in response to receiving the master ticket, storing the third-party library within the central repository.

2. The tangible, non-transitory, machine-readable medium of claim 1, wherein the machine-readable instructions, when executed by the one or more processors, cause the one or more processors to:
   identify a hierarchical relationship between the third-party library and one or more approved third-party libraries of the plurality of approved third-party libraries; and
   store an identifier indicative of the hierarchical relationship in an entry of the central repository associated with the third-party library.

3. The tangible, non-transitory, machine-readable medium of claim 1, wherein the third-party library is contained within a set of source code, and wherein the machine-readable instructions, when executed by the one or more processors, cause the one or more processors to:
   identify the third-party library within the set of source code; and in response to identifying the third-party library and determining that the third-party library is not stored within the central repository, request the master ticket for the third-party library.

4. The tangible, non-transitory, machine-readable medium of claim 1, wherein the score is determined via machine learning performed on the plurality of approved third-party libraries.

5. The tangible, non-transitory, machine-readable medium of claim 1, wherein the machine-readable instructions, when executed by the one or more processors, cause the one or more processors to:
  determine that the score of the third-party library is not above the threshold score; and
  transmit a request for the master ticket to a manual approval system.

6. The tangible, non-transitory, machine-readable medium of claim 5, wherein the master ticket is provided by the manual approval system in response to the manual approval system determining that the third-party library meets a threshold number of qualifications.

7. The tangible, non-transitory, machine-readable medium of claim 5, wherein the machine-readable instructions, when executed by the one or more processors, cause the one or more processors to provide an indication of non-approval of the third-party library in response to the manual approval system determining that the third-party library does not meet a threshold number of qualifications.

8. The tangible, non-transitory, machine-readable medium of claim 1, wherein the machine-readable instructions, when executed by the one or more processors, cause the one or more processors to:
  receive a second approval request to incorporate the third-party library within a second software release;
  determine that the third-party library is stored within the central repository;
  request a usage ticket for the third-party library, wherein the usage ticket is indicative of specific approval of the third-party library for incorporation within the second software release;
  receive the usage ticket; and
  in response to receiving the usage ticket, store the usage ticket in a database.

9. The tangible, non-transitory, machine-readable medium of claim 8, wherein the machine-readable instructions, when executed by the one or more processors, cause the one or more processors to provide a report indicative of a current status of each requested master ticket and each requested usage ticket.

10. A method, comprising:
  receiving a first approval request to incorporate a third-party library within a particular software release;
  determining whether the third-party library is stored within a central repository configured to store a plurality of approved third-party libraries;
  in response to determining that the third-party library is not stored within the central repository, requesting a master ticket for the third-party library, wherein the master ticket is indicative of universal approval of the third-party library for incorporation within a plurality of software releases;
  in response to determining that the third-party library is stored within the central repository, requesting a usage ticket for the third-party library, wherein the usage ticket is indicative of specific approval of the third-party library for incorporation within the particular software release;
  determining a score of the third-party library based on characteristics of the third-party library, wherein the score comprises a numeric value;
  determining whether the score is below a threshold score;
  transmitting the third-party library to a manual approval system in response to determining that the score is below the threshold score; and
  receiving the master ticket or the usage ticket in response to determining that the score is below the threshold score.

11. The method of claim 10, wherein the master ticket is requested, and wherein the method comprises storing the third-party library in the central repository in response to receiving the master ticket.

12. The method of claim 10, wherein the usage ticket is requested, and wherein the method comprises providing output indicative of approval of the third-party library for incorporation within the particular software release.

13. The method of claim 10, comprising analyzing the plurality of approved third-party libraries via machine learning to determine target characteristics of the approved third-party libraries, wherein the score is determined based on a correspondence between characteristics of the third-party library and the target characteristics.

14. The method of claim 10, comprising:
  receiving feedback from the manual approval system indicating that the third-party library meets engineering qualifications, security qualifications, legal qualifications, or any combination thereof; and
  receiving the master ticket or the usage ticket in response to the feedback.

15. A system, comprising:
  a central repository comprising a plurality of approved third-party libraries; and a processor configured to perform operations comprising:
  receiving a first approval request to incorporate a third-party library within a first software release;
  determining whether the third-party library is stored within the central repository;
  requesting a master ticket for the third-party library in response to determining that the third-party library is not stored in the central repository;
  requesting a usage ticket for the third-party library in response to determining that the third-party library is stored in the central repository;
  analyzing the third-party library to determine a score of the third-party library;
  receiving the master ticket or the usage ticket in response to determining that the score is above a threshold score;
  storing the master ticket or the usage ticket in a ticket database in response to receiving the master ticket or the usage ticket, querying the ticket database to generate a report indicative of a status of the third- party library; and
  providing the report to a user device in response to a predetermined threshold time elapsing.

16. The system of claim 15, wherein the master ticket is requested, and wherein the processor is configured to store the third-party library in the central repository in response to receiving the master ticket.

17. The system of claim 15, wherein the master ticket is indicative of universal approval of the third-party library for incorporation within a plurality of software releases comprising the first software release, and wherein the usage ticket is indicative of specific approval of the third-party library for incorporation within the first software release.

* * * * *